(12) United States Patent
Lin et al.

(10) Patent No.: US 8,168,698 B2
(45) Date of Patent: May 1, 2012

(54) METHOD OF USING HYPERBRANCHED POLYAMINE TO EXFOLIATE INORGANIC CLAY INTO RANDOM FORM OF NANOSILICATE PLATELET

(75) Inventors: Jiang-Jen Lin, Taichung (TW); Chih-Wei Chiu, Taipei (TW); Chien-Chia Chu, Taipei (TW)

(73) Assignee: National Taiwan University, Taipei (TW)

( * ) Notice: Subject to any disclaimer, the term of this patent is extended or adjusted under 35 U.S.C. 154(b) by 301 days.

(21) Appl. No.: 12/567,674

(22) Filed: Sep. 25, 2009

(65) Prior Publication Data

US 2010/0081732 A1 Apr. 1, 2010

Related U.S. Application Data

(60) Division of application No. 11/464,495, filed on Aug. 15, 2006, now abandoned, which is a continuation-in-part of application No. 10/685,213, filed on Oct. 14, 2003, now Pat. No. 7,125,916.

(51) Int. Cl.
*C08K 9/06* (2006.01)
*C08K 3/34* (2006.01)

(52) U.S. Cl. ........ 523/216; 524/445; 524/446; 524/447; 524/449; 428/402; 252/378 R (58) Field of Classification Search .................. 523/216, 523/400, 443; 524/445, 446, 447, 449; 428/402; 252/378 R
See application file for complete search history.

(56) References Cited

U.S. PATENT DOCUMENTS

| 4,940,770 A | * | 7/1990 | Speranza et al. | 528/111 |
| 7,125,916 B2 | * | 10/2006 | Lin et al. | 523/216 |
| 2005/0080180 A1 | * | 4/2005 | Lin et al. | 524/445 |

* cited by examiner

*Primary Examiner* — Vickey Nerangis
(74) *Attorney, Agent, or Firm* — Pai Patent & Trademark Law Firm; Chao-Chang David Pai (57) ABSTRACT

A method for producing random form of nanosilicate platelets comprises mixing and acidifying an exfoliating agent with an inorganic acid to form an acidified exfoliating agent; intercalating layered inorganic silicate clay with the acidified exfoliating agent to form a mixture; and dissolving the mixture in a solvent and reacting it with a hydroxide or chloride of alkali metal or alkaline-earth metal. The hyperbranched polyamines serving as the exfoliating agent are prepared by polymerizing poly(oxypropylene)-triamine and diglycidyl ether of bisphenol-A (DGEBA). Hydrophilic amine groups of the exfoliating agent are acidified and then reacted with the layered inorganic silicate clay through cation exchange reaction and physical clay exfoliation to give random form of nanosilicate platelets.

21 Claims, 7 Drawing Sheets

METHOD OF USING HYPERBRANCHED POLYAMINE TO EXFOLIATE INORGANIC CLAY INTO RANDOM FORM OF NANOSILICATE PLATELET

CROSS-REFERENCE TO RELATED APPLICATIONS

The present application is a divisional application of prior U.S. application Ser. No. 11/464,495 filed Aug. 15, 2006, which is currently abandoned and incorporated by reference herein in its entirety; said prior application is a continuation-in-part (CIP) of prior U.S. application Ser. No. 10/685,213, filed Oct. 14, 2003, which has issued as U.S. Pat. No. 7,125,916 on Oct. 24, 2006 and is incorporated by reference herein in its entirety.

BACKGROUND OF THE INVENTION

1. Field of the Invention

The present invention relates to a hyperbranched polyamine and its use to exfoliate an inorganic clay into random form of nanosilicate platelets; wherein the hyperbranched polyamine as an exfoliating agent is prepared by polymerizing poly(oxypropylene)-triamine with diglycidyl ether of bisphenol-A (DGEBA) and a subsequent acidification step by inorganic acid; and the layered inorganic silicate clay can be completely exfoliated by hydrophilic ammonium-salt groups of the polyamine exfoliating agent. The present invention further relates to a method for producing nanosilicate platelets which can be extracted from the exfoliated clay.

2. Related Prior Arts

Basically, interlayer distances of the layered inorganic clay such as montmorillonite (MMT) or synthetic fluorinated mica (Mica), can be increased from 10 Å to 20 Å through ion exchange reaction of the organic quaternary ammonium salts, and thus monomers can access in and out. "Intercalation" is used to indicate that organic molecules are embedded in the inorganic aluminosilicate interlayers while the clay structure remains in the form of layer stack crystals with constant interlayer space distance; and "exfoliation" indicates that each layer of the inorganic layers is present in the random form. The "intercalated" clay by an ionic surfactant generally can be dispersed in monomers or polymers and through a mixing procedure or polymerization procedure to produce a distribution of singular nano layers in polymer nanocomposite materials.

Conventional intercalating agents such as 12-aminolauric acid, hexadecyl amine salt, octadecyl amine salt, bis(2-hydroxyethyl)methyl tallow alkyl ammonium chloride and other fatty alkyl amine salts, usually have low molecular weights and polar ammonium groups, and thus can exchange with the counter cations within the layered silicate clays. As a result, organic intercalating agents may be embedded and the hydrophobicity of the inorganic clay is promoted to facilitate exfoliation and affinity with monomers or polymers.

In addition, T. J. Pinnavaia (Michigan State University) found that diglycidyl ether of bisphenol-A (epoxy resin Epon828) can polymerize with MMT to form a nano-scaled polyether/clay composite by using the alkyl amine salt intercalant, $CH_3(CH_2)_n$—$NH_3^+$. For different formulae of the intercalant, d spacing can be enlarged to 18.0 Å. The intercalated MMT can further polymerize with the epoxy resin at 75° C. to give an epoxy/clay material with d spacing 34.1 Å. The product is proved to perform better heat distortion temperature (HDT). This intercalant may regularly act from monolayer to bilayer, and further to pseudo-trimolecular, with an interlayer distance ranging from 13.8 to 18.0 Å. Within the layers of such width, the epoxy resin can enter and disperse the layered inorganic to give a nano material.

The conventional process for delaminate the layered clay to randomly exfoliated clay takes two main procedures: intercalating the clay with a surfactant and then blending with polymers for the clay exfoliation. In U.S. Pat. No. 6,822,019, the present inventor provided an intercalant prepared by copolymerizing poly(oxypropylene)-amine and polypropylene-grafting-maleic anhydride (PP-g-MA), which is used to intercalate MMT. In U.S. Pat. No. 6,765,050, the present inventor also provided an intercalant prepared by acidifying poly(oxypropylene)-amine to increase the interlayer distance of MMT to an unprecedented range. In U.S. Pat. No. 7,022,299, the present inventor further exfoliating the product of poly(oxypropylene)-amine and PP-g-MA by emulsification and displacement reaction with sodium hydroxide. The exfoliated nanosilicate platelet has a high-aspect-ratio and charge density. Moreover, the present inventor provided an exfoliating agent in U.S. Publication No. 2005-00801805, which is prepared by acidifying product of polymerizing poly(oxypropylene)-diamine and DGEBA. This exfoliating agent can modify the layered clay through only one step.

In the present invention, a hyperbranched polyamine with multiple functional groups is provided as an exfoliating agent. This exfoliating agent can be used to directly exfoliate an inorganic clay such as MMT and Mica through the intercalation and displacement reaction. Further, random form of nanosilicate platelets can be extracted from the product solution.

SUMMARY OF THE INVENTION

The object of the present invention is to provide hyperbranched polyamine and a method for producing the same, in which poly(oxypropylene)-triamine and DGEBA react to form a hyperbranched polyamine with multiple functional groups.

Another object of the present invention is to provide nanosilicate platelets and a method for producing the same, in which the exfoliating agent obtained from poly(oxypropylene)-triamine and DGEBA exfoliates a layered inorganic silicate clay into a random form of nanosilicate platelets.

A further object of the present invention is to apply the nanosilicate platelets to antiseptic and antimicrobial treatment.

In the present invention, the method for producing the hyperbranched polyamine structure includes a step of: (a) mixing and reacting a poly(oxypropylene)-triamine with DGEBA to produce amine-terminated BPA epoxy oligomers (AEO), wherein BPA is the abbreviation of bisphenol-A, the poly(oxypropylene)-triamine has a molecular weight ranging from 100 to 10,000 and each of the AEO has multiple secondary and/or primary amine functional groups.

The poly(oxypropylene)-triamine of the step (a) generally has a formula as follows:

wherein each of a, a' and a" has a respective value in the range of 4~5, 16~17 or 27~28 with a proviso that |a−a'|<2, |a−a"|<2 and |a'−a"|<2. For example, the product of Huntsman Chemical Co., trademark Jeffamine® POP-T403, POP-T3000 and POP-T5000.

The DGEBA of the step (a) generally has a formula as follows:

wherein b=0~2.

In the reaction of the step (a), poly(oxypropylene)-triamine and DGEBA preferably have a molar ratio ranging from 0.3:1 to 1:1 and react at 20~200° C. for 8~24 hours.

According to the above method, the present invention produces a novel exfoliating agent for exfoliating inorganic clay. In the present invention, the exfoliating agent preferably has a formula as follows:

wherein each of a, a' and a" has a respective value in the range of 4~5, 16~17 or 27~28 with a proviso that |a−a'|<2, |a−a"|<2 and |a'−a"|<2, and b=1~3.

In the present invention, the method for producing the nanosilicate platelets with the exfoliating agent includes the steps of: (b) acidifying an exfoliating agent with an inorganic acid, wherein the exfoliating agent is amine-terminated BPA epoxy oligomers (AEO) having multiple secondary and/or primary amine functional groups in the structure thereof and is obtained by reacting poly(oxypropylene)-triamine having molecular weight ranging from 100 to 1,000 with DGEBA; (c) intercalating layered inorganic silicate clay with the acidified exfoliating agent to form a first mixture; and (d) dissolving the first mixture in a first solvent, and reacting with at least one equivalent of a hydroxide or chloride of alkali metal or alkaline-earth metal through a displacement reaction to form a second mixture containing nanosilicate platelets.

In the step (b), the inorganic acid can be hydrochloric acid, nitric acid, phosphoric acid, sulfuric acid, or any acid capable of performing the similar effect. Preferably, the exfoliating agent and the inorganic acid have an equivalent ratio amine: $H^+$=0.5:1~3:1, and react at 30~70° C.

In the step (c), the layered inorganic silicate clay is preferably montmorillonite, mica, kaolin, vermiculite, K10 montmorillonite, synthetic clay SWN or layered double hydroxides (LDH), and more preferably swelled synthetic fluorinated mica or montmorillonite. The layered inorganic silicate clay preferably has a cationic exchange capacity (CEC) ranging from 0.5 to 2.0 mequiv/g. The exfoliating agent and the layered inorganic silicate clay preferably have an equivalent ratio amine:CEC>1. The hyperbranched polyamine in acidified exfoliating agent and CEC of the layered inorganic silicate clay of the step (c) preferably have an equivalent ratio ranging from 0.3:1 to 5:1. The intercalation reaction is preferably performed at 70~90° C. for 3~5 hours.

In the step (d), the first solvent can be methanol or any other proper solvent. The first mixture and the first solvent are preferably mixed in a volume ratio ranging from 0.03:1 to 30:1. The hydroxide or chloride of alkali metal or alkaline-earth metal can be NaOH or KOH. The first mixture and the hydroxide or chloride of alkali metal or alkaline-earth metal preferably have an equivalent ratio ranging from 0.3:1 to 3:1. The displacement reaction is preferably performed at 50~70° C. for 1~3 hours. To react more completely, the step (d) may be repeated.

Moreover, after the step (d), the method can include another step: (e) mixing the second mixture with water and a second solvent for extraction and an extract containing nanosilicate platelets is obtained. The second solvent can be toluene. When the first solvent is methanol and the second solvent is toluene, volume ratio of methanol:toluene:water preferably ranges from 0.3:0.3:1.0 to 3:3:1. The extraction is preferably performed at 30~70° C. for 1~3 hours.

After the step (e), the method can further include another step: (f) removing the first and/or second solvent from the extract containing the nanosilicate platelets. A random form of nanosilicate platelets can be produced according to the step (f) of the method. Preferably, the random form of nanosilicate platelets has an organic/inorganic ratio ranging from 10/90 to 90/10; and/or comprises Si (20~50 wt %), Mg (10~30 wt %), Al (0~10 wt %), Na (1~10 wt %), Fe (0~1.0 wt %) and F (1~15 wt %). The nanosilicate platelets generally has a diameter ranging from 50 to 1500 nm, and a thickness ranging from 0.5 to 1.5 nm.

Additionally, in a test of the present invention, the nanosilicate platelets are shown to be effective in antiseptic and antimicrobial treatment.

Some preferred embodiments are exemplified to describe the present invention and effects of the product are shown.

BRIEF DESCRIPTION OF THE DRAWINGS

FIG. 3 shows

DETAILED DESCRIPTION OF THE PREFERRED EMBODIMENTS

The materials used in the preferred embodiments of the present invention include:

(1) Poly(oxypropylene)-diamine: Huntsman Chemical Co. or Aldrich Chemical Co., trademark Jeffamine® D-400, average molecular weight ($M_w$)=400, structural formula:

$$H_2NCHCH_2-[OCHCH_2]_a-(OCH_2CH_2)_b-[OCH_2CH]_c-NH_2$$
$$\quad\ \ |\qquad\quad\ \ \ |\qquad\qquad\qquad\qquad\qquad\ \ |$$
$$\ \ \ CH_3\qquad\ \ CH_3\qquad\qquad\qquad\qquad\qquad CH_3$$

$$a = b = 5{\sim}6, b = 0$$

(2) Poly(oxypropylene)-triamine: Huntsman Chemical Co. or Aldrich Chemical Co., trademark Jeffamine® T403, $M_w$=440, structural formula:

$$H_2N{-}(CHCH_2O)_a{-}CH_2CCH_2CH_3$$ 
with branches $CH_2{-}(OCH_2CH)_{a'}{-}NH_2$ and $CH_2{-}(OCH_2CH)_{a''}{-}NH_2$ (each with $CH_3$)

wherein each of a, a' and a" has a respective value in the range of 4~5 with a proviso that |a−a'|<2, |a−a"|<2 and |a'−a"|<2.

(3) Liquid DGEBA (diglycidyl ether of bisphenol-A): Taiwan Nan Ya Plastics Co., trademark BE-188, $M_w$=350, epoxy equivalent weight (EEW)=188, structural formula:

[Structural formula of DGEBA with b = 0~2]

(4) Synthetic fluorinated mica: Japan CO-OP Chemical Co., SOMASIF ME-100, composed of Si (26.5 wt %), Mg (15.6 wt %), Al (0.2 wt %), Na (4.1 wt %), Fe (0.1 wt %) and F (8.8 wt %), cation exchange capacity (CEC)=1.20 mequiv/g.

(5) Natural $Na^+$-MMT: Nanocor Ind. Co., CEC=1.15 mequiv/g.

In the present invention, natural mica unable to be swelled is replaced with the synthetic fluorinated mica which can be swelled by water as the natural MMT. As the polar structure and interlayered metal ions of the natural MMT (or the synthetic fluorinated mica) can be hydrated with water and therefore can be dispersed therein. The clays used in the following Examples are swelled as follows:

dispersing clay (100 g) in hot water (10 L, 80° C.) and vigorously agitating for 4 hours to give a stable, uniform and earth-colored dispersion.

Examples 1~2

Preparation of Nano Mica Platelets (NMP)

Example 1

Step (a) Synthesis of the exfoliating agent (hyperbranched polyamine with multiple amine functional groups)

Figure 1:
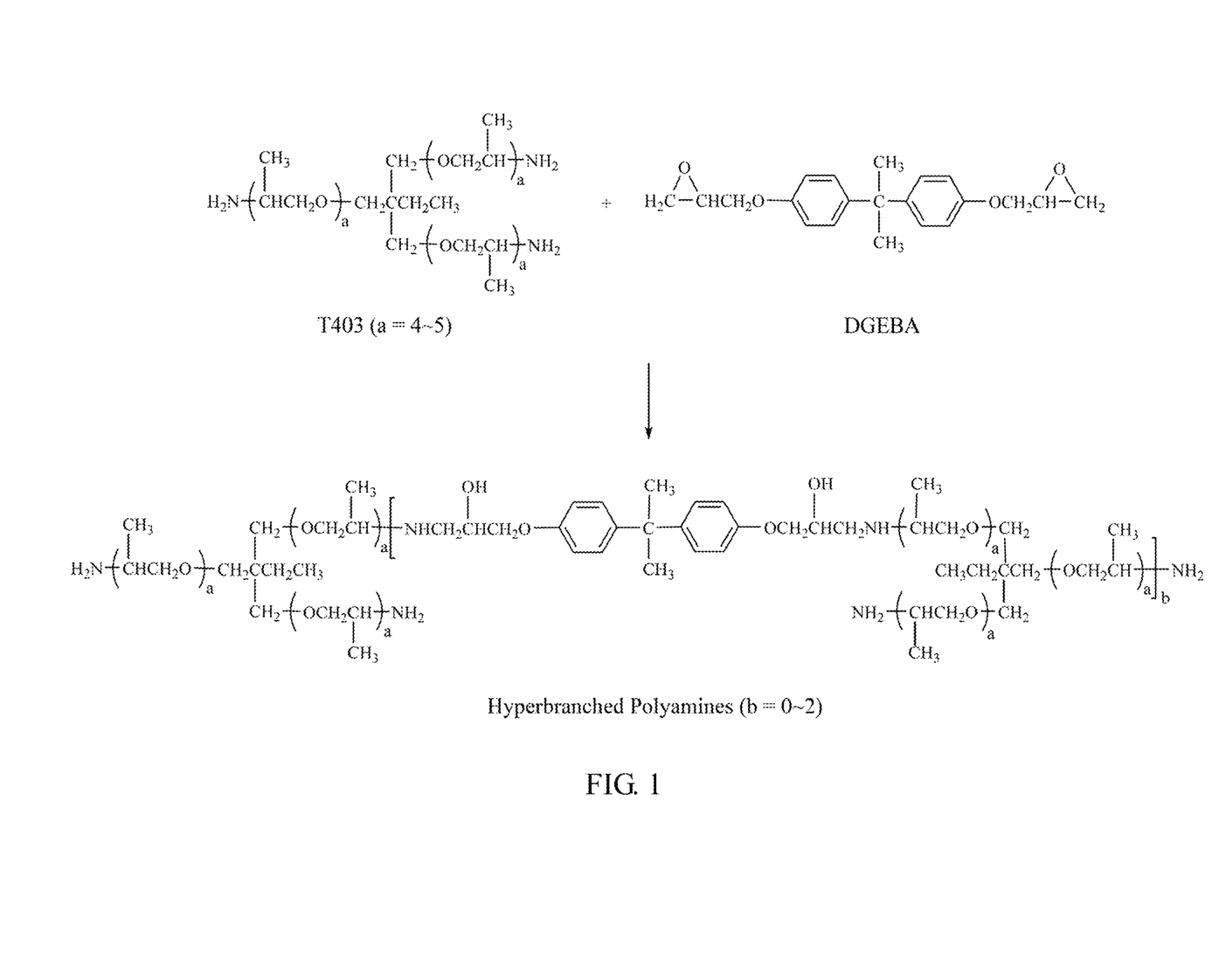
FIG. 1 shows the process for synthesizing the exfoliating agent from triamine (Jeffamine T403).

T403 (71.5 g, 163 mmoles) and DGEBA (28.5 g, 81.4 mmoles) are added in a 250 mL three-necked flask (molar ratio of T403:DGEBA=2:1), and then mechanically agitated at room temperature for 8 hours. The reaction is completed when the epoxy absorption peak (910 cm$^{-1}$) disappears by monitoring with FTIR (Fourier transform infrared spectroscopy) to produce a sticky liquid, i.e., the T403 AEO (amine-terminated BPA epoxy oligomer) exfoliating agent. FIG. 1 shows the process.

Step (b) Acidification

T403 AEO (48 g, 39 mmols) is dissolved in methanol (100 g). Hydrochloric acid (35 wt %, 7.5 g) is diluted with water (50 mL), and then added dropwise into the T403 AEO to form an amine/HCl amine salt at room temperature.

Step (c) Intercalation

The acidified AEO is then poured into a mica dispersion (10 g of mica swelled in 1 L of deionized water), and agitated at 80° C. for 3 hours, and then filtered. The filtered solid is dried in vacuum at 70° C. to give a first mixture of T403 AEO/mica.

Step (d) Filtration

The first mixture of T403 AEO/mica is dispersed in methanol (200 mL) at 80° C., and then NaOH (4.8 g) is added in the same equivalent to give a cream-colored sticky slurry. The slurry is then filtered to obtain a second mixture of T403 AEO/mica with a transparent slightly-white look. The result of TGA analysis is organic/inorganic=50/50.

Step (e) Displacement Reaction

To the second mixture of T403 AEO/mica, methanol (200 mL) is first added at 80° C., and then deionized water (200 mL) and two equivalent of NaOH (9.6 g) are mixed therein, to give a solution containing nano mica platelets.
Step (f) Extraction To the solution containing the nano mica platelets, toluene (200 mL) is added and well mixed, and then left to stand for one day to give a three-phased solution. The upper phase includes toluene and T403 AEO, the middle phase includes methanol, and the lower phase includes water containing the NMP. The lower phase is separated and concentrated at 80° C. through depression in a centrifuge to give a NMP suspension with 10 wt % of solid content.

Example 2

Step (a)
The procedures of Example 1 are repeated.
Steps (b) and (c)
The procedures of Example 1 are repeated, but the dosages are decreased to 1/10 of those in Example 1.
Step (d)
The procedures of Example 1 are repeated, but the dosages are decreased to 1/10 of those in Example 1. A solid mixture of T403 AEO/mica with a slightly-white translucent material is obtained. The result of TGA analysis is organic/inorganic=50/50.
Steps (e) and (f)
The procedures of Example 1 are repeated, but the dosages are decreased to 1/10 of those in Example 1. The concentrated NMP suspension includes 10 wt % of solid content.

Example 3

Preparation of Nanosilicate Platelets (NSP)

Steps (a)~(f)
The procedures of Example 1 are repeated, but the synthetic mica in the step (c) is replaced with MMT with an equivalent ratio of amine/H+/MMT=18/6/1 as is in Example 1.

Examples 4~5

Synthesis of the Exfoliating Agent T403 AEO with Reactants of Various Ratios

The procedures of Step (a) of Example 1 are repeated, but the ratio of poly(oxypropylene)-triamine T403:DGEBA is set to 3:1 and 4:1 respectively, and finally sticky and viscous liquids are prepared.

Comparative Examples 1~5

The procedures of Steps (a)~(f) of Example 1 are repeated; but the molar ratio of T403 AEO/HCl/mica and the equivalent ratio of amine/H+/mica are varied as Table 1.

TABLE 1

| Example/Comparative Example | T403 AEO/HCl/mica (molar ratio) | amine/H+/mica (equivalent ratio) |
|---|---|---|
| Examples 1~2 | 3/6/1 | 18/6/1 |
| Comparative Example 1 | — | — |
| Comparative Example 2 | 1/1/1 | 6/1/1 |
| Comparative Example 3 | 1/2/1 | 6/2/1 |
| Comparative Example 4 | 1/3/1 | 6/3/1 |
| Comparative Example 5 | 2/4/1 | 12/4/1 |

Comparative Examples 6~8

The procedures of Steps (a)~(f) of Example 3 are repeated; but the ratio of T403 AEO/HCl/MMT and the equivalent ratio of NH$_2$/H+/mica are varied as Table 2.

TABLE 2

| Example/Comparative Example | T403 AEO/HCl/MMT (molar ratio) | amine/H+/MMT (equivalent ratio) |
|---|---|---|
| Example 3 | 3/6/1 | 18/6/1 |
| Comparative Example 6 | — | — |
| Comparative Example 7 | 2/4/1 | 12/4/1 |
| Comparative Example 8 | 1/2/1 | 6/2/1 |

Comparative Example 9

Figure 2:
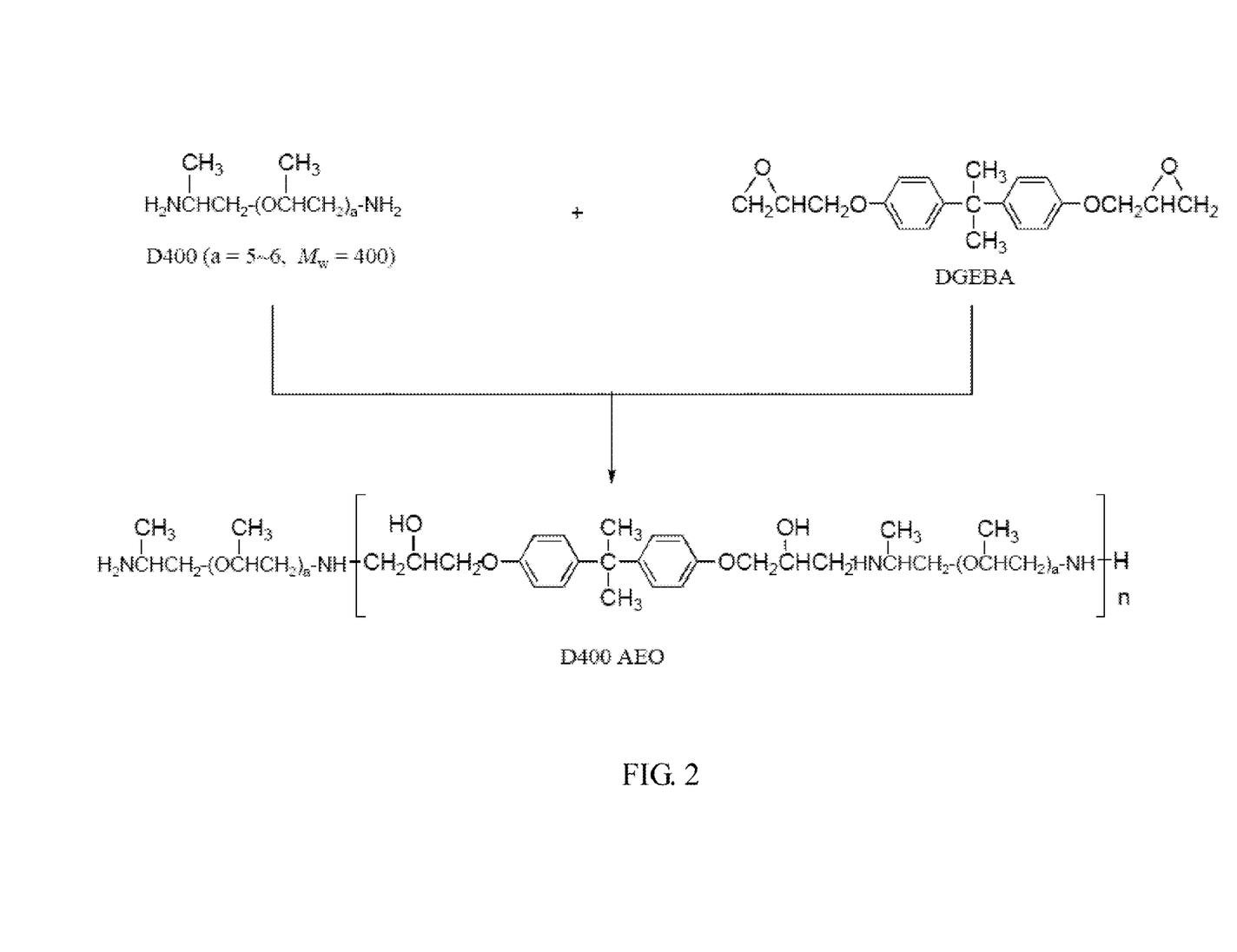
FIG. 2 shows the process for synthesizing the intercalant from diamine (Jeffamine D-series).

The procedures of Steps (a)~(f) of Example 1 are repeated; but poly(oxypropylene)-triamine T403 used in Step (a) is replaced with poly(oxypropylene)-diamine D400 to give D400 AEO. The mica is added with the same ratio of amine/H+/mica as that in Example 1. FIG. 2 shows such process.

Comparative Example 10

The procedures of Steps (a)~(f) of Example 3 are repeated; but poly(oxypropylene)-triamine T403 used in Step (a) is replaced with poly(oxypropylene)-diamine D400 to give D400 AEO. The MMT is added with the same ratio of amine/H+/MMT as that in Example 3.
Analysis for the Exfoliating Agents Prepared with Different Conditions Results of titration for amino groups of T403 AEO prepared in Example 1 indicate that primary amine is 2.6 mequiv/g, secondary amine is 2.2 mequiv/g, and tertiary amine is 0 mequiv/g.

Figure 3A:
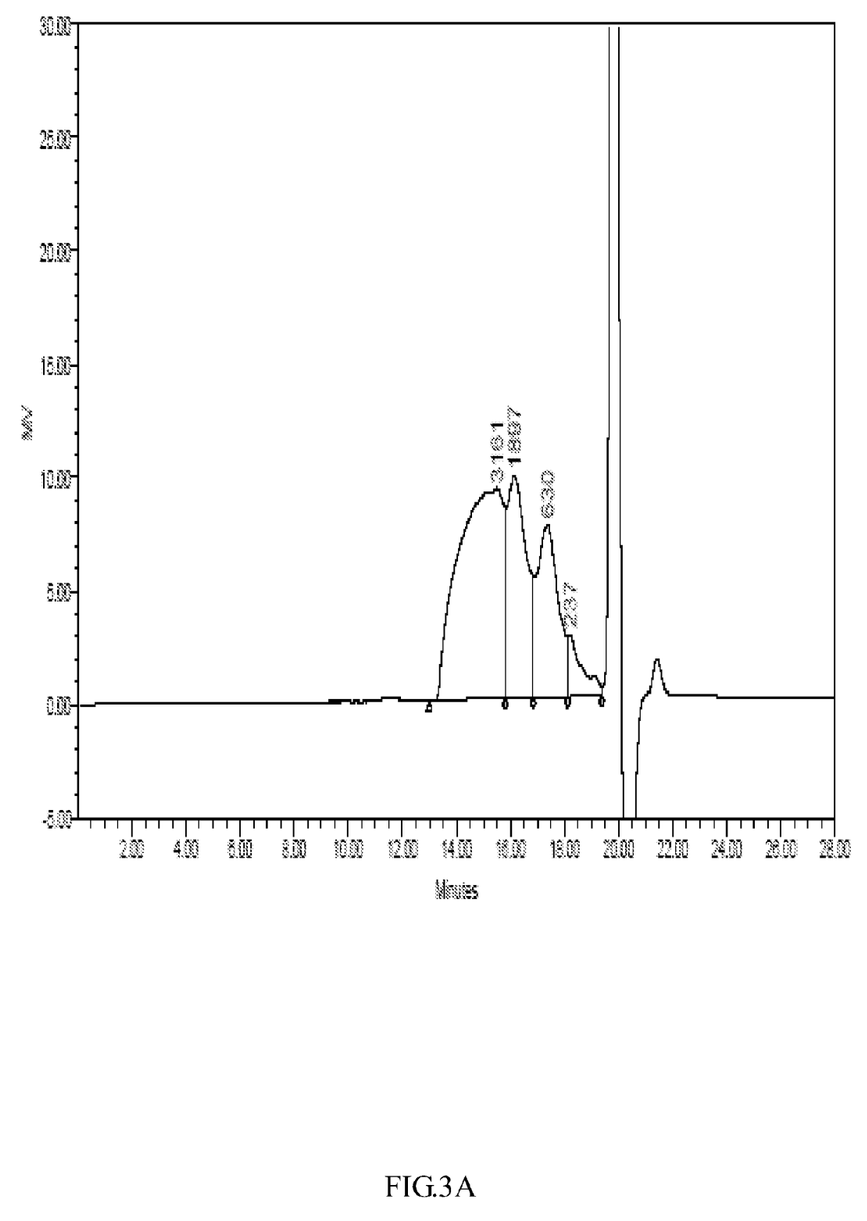
FIGS. 3A-3C show the GPC spectra of the exfoliating agents (T403 AEO and D400 AEO).
Figure 3B:
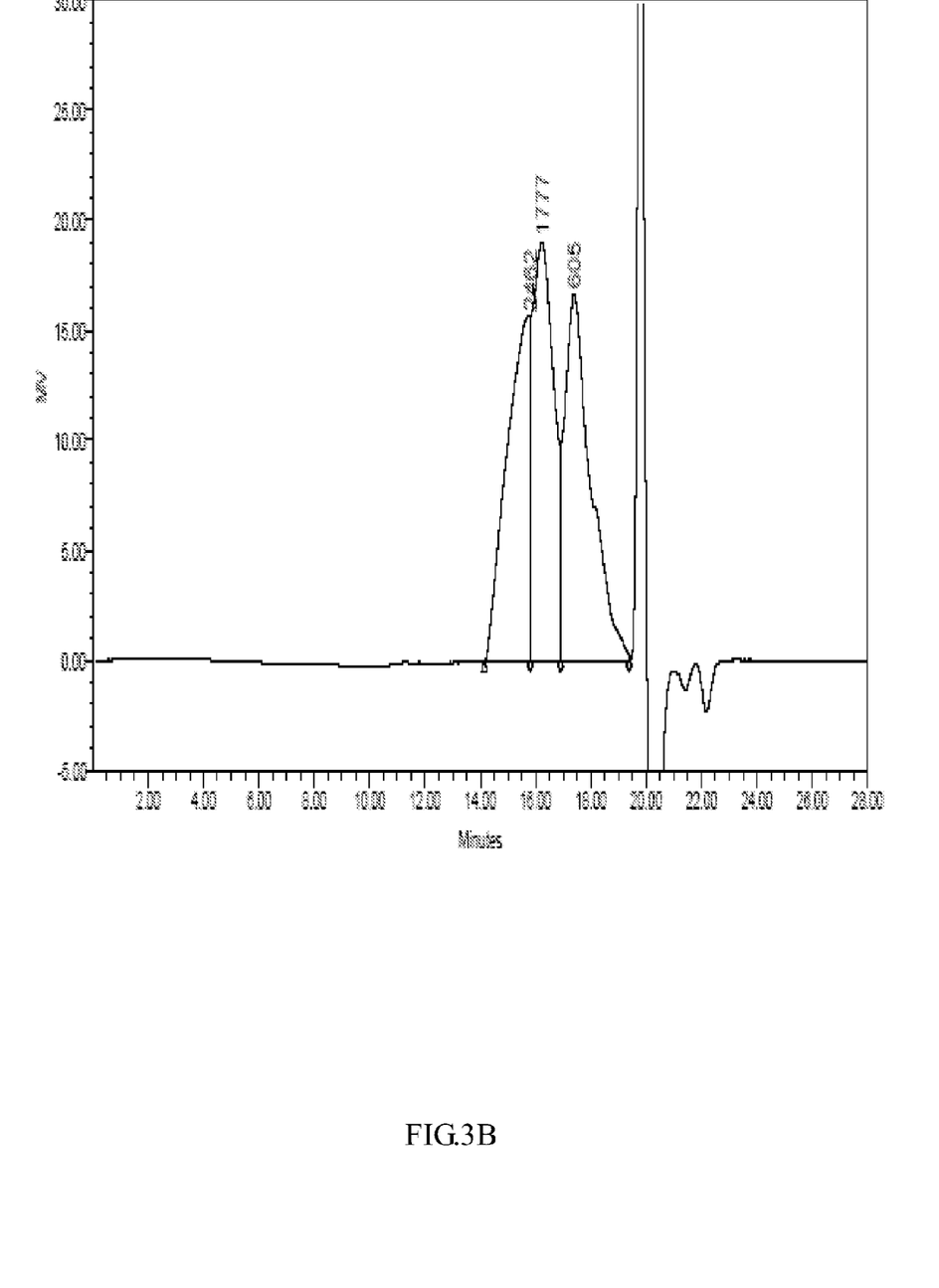
Figure 3C:
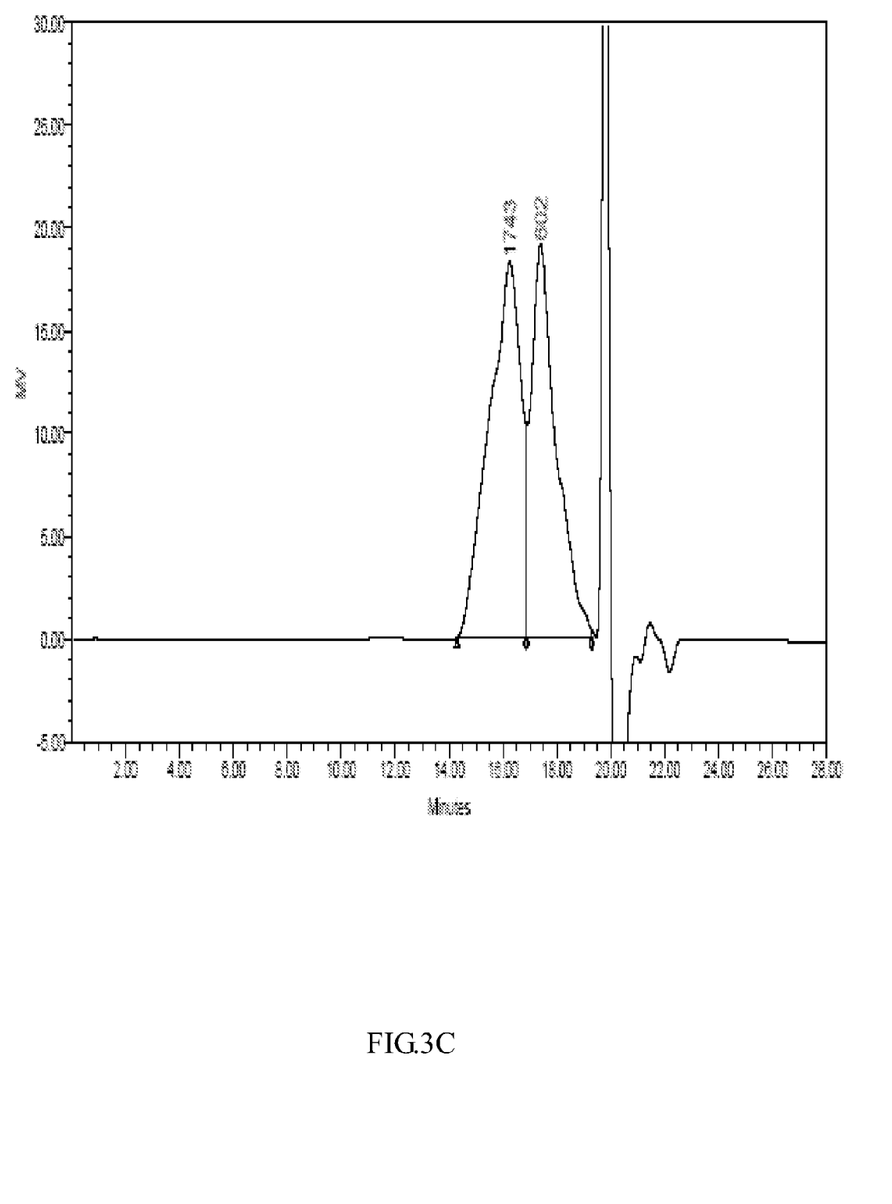
Figure 4:
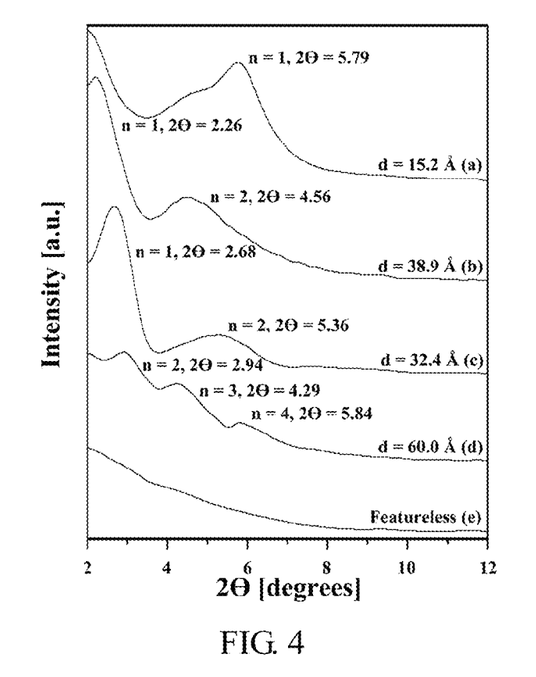
FIG. 4 shows the XRD spectrum of the nano mica platelets.

FIGS. 3A-3C respectively show the Gel Permeation Chromatography (GPC) spectra of the exfoliating agent T403 AEO prepared in Example 1, 4 and 5. For Example 1, the spectrum indicates four different molecular weights, i.e., 3,161, 1,897, 630 and 237. The oligomer is predicted to have a degree of polymerization ranging from 1 to 3 from the molecular weights and amino equivalents thereof, and thus is a hyperbranched compound. For Example 4, the spectrum indicates three molecular weights, i.e., 2,462, 1,777 and 650. For Example 5, the spectrum indicates two molecular weights, i.e., 1,743 and 602.
Analysis for the Nano Mica Platelets
1. X-ray Diffraction (XRD)
FIG. 4 and Table 3 respectively show the XRD spectrum and TGA analysis of intercalating or exfoliating products of the synthetic mica. FIG. 4 shows the XRD spectrum of the nano mica platelets, in which molar ratios of T403 AEO/H$^+$/mica are respectively (a) 1/1/1, (b) 1/2/1, (c) 1/3/1, (d) 2/4/1, and (e) 3/6/1. As indicated in FIG. 4 and Table 3, different ratios of poly(oxypropylene)-triamine T403, hydrochloric acid and mica used in Comparative Examples 1~5 can merely enlarge the interlayer distance of mica to 15.2~60 Å, but no exfoliation is observed. When the molar ratio of T403 AEO/HCl/mica is 3/6/1 (i.e., equivalent ratio of amine/H$^+$/mica is 18/6/1), the interlayer distance is featureless (randomization) and the weight ratio of the exfoliating agent/clay in the nanosilicate platelets is 76/24.

TABLE 3

| Example/<br>Comparative<br>Example | T403 AEO/<br>HCl/mica<br>(molar ratio) | amine/H$^+$/mica<br>(equivalent ratio) | Interlayer<br>distance<br>(Å) | Weight ratio of the<br>exfoliating agent/clay<br>(w/w) |
|---|---|---|---|---|
| Examples 4~5 | 3/6/1 | 18/6/1 | Exfoliated$^a$ | 76/24 |
| Comparative Example 1 | — | — | 12.6 | — |
| Comparative Example 2 | 1/1/1 | 6/1/1 | 15.2 | 30/70 |
| Comparative Example 3 | 1/2/1 | 6/2/1 | 38.9 | 58/42 |
| Comparative Example 4 | 1/3/1 | 6/3/1 | 32.8 | 50/50 |
| Comparative Example 5 | 2/4/1 | 12/4/1 | 60.0 | 68/32 |

$^a$featureless or random form of the XRD pattern, indicating a randomization of the clay layered structure.

Table 4 lists intercalating and exfoliating effects of Example 1 and Comparative Example 9 respectively using T403 AEO and D400 AEO in reacting with mica. For the same equivalent of amine/H$^+$/mica, T403 AEO can achieve complete exfoliation, but D400 AEO can only increase the interlayer distance of the mica to 25.5 Å. The result indicates the difference in effectiveness for clay exfoliation between hyperbranched T403 AEO and D400 AEO.

TABLE 4

| Example/<br>Comparative<br>Example | Exfoliating<br>agent/<br>Intercalant | amine/H$^+$/mica<br>(exuivalent ratio) | Interlayer<br>distance<br>(Å) | Weigth ratio<br>of the exfo-<br>liating agent/<br>clay (w/w) |
|---|---|---|---|---|
| Example 1 | T403 AEO | 18/6/1 | Exfoliated$^a$ | 76/24 |
| Comparative Example 9 | D400 AEO | 18/6/1 | 25.5 | — |

$^a$featureless or random form of the XRD pattern, indicating a randomization of the clay layered structure.

2. Transmission Electronic Microscopy (TEM)

Figure 5:
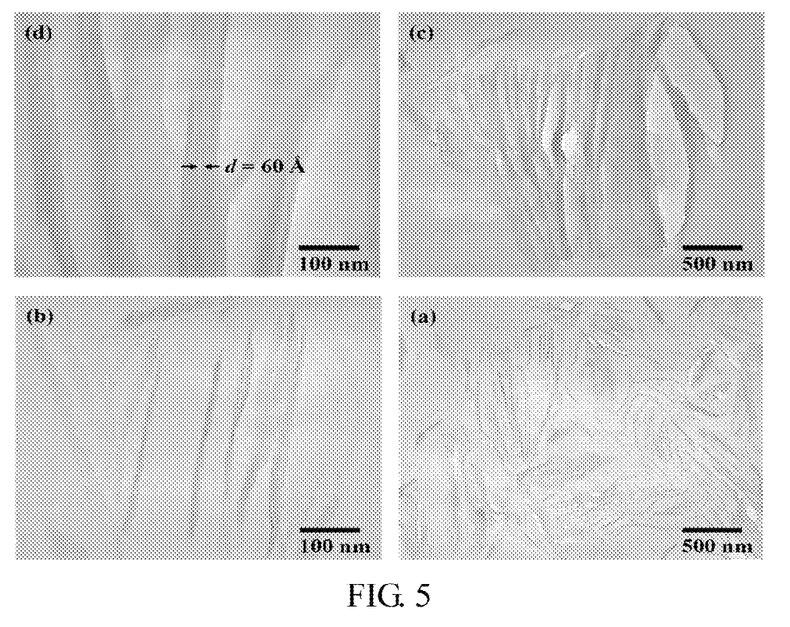
FIG. 5 shows the TEM picture of the nano mica platelets embedded in the epoxy resin.

FIG. 5 shows the TEM picture of the nano mica platelets embedded in the epoxy resin. The original mica tends to aggregate due to van der Waals force or ionic bonding thereof, but the mica aggregation is scattered in the random form after exfoliation. In FIG. 5, pictures (a) and (b) show the exfoliated nano mica platelets with a molar ratio of T403 AEO/H$^+$/mica=3/6/1 and a random platelet form in the XRD analysis; pictures (c) and (d) show the intercalated mica with a molar ratio of T403 AEO/H$^+$/mica=2/4/1 and a stacking aggregation of mica plates in the XRD analysis (d spacing=60.0 Å).

3. Atomic Force Micrograph (AFM)

Figure 6:
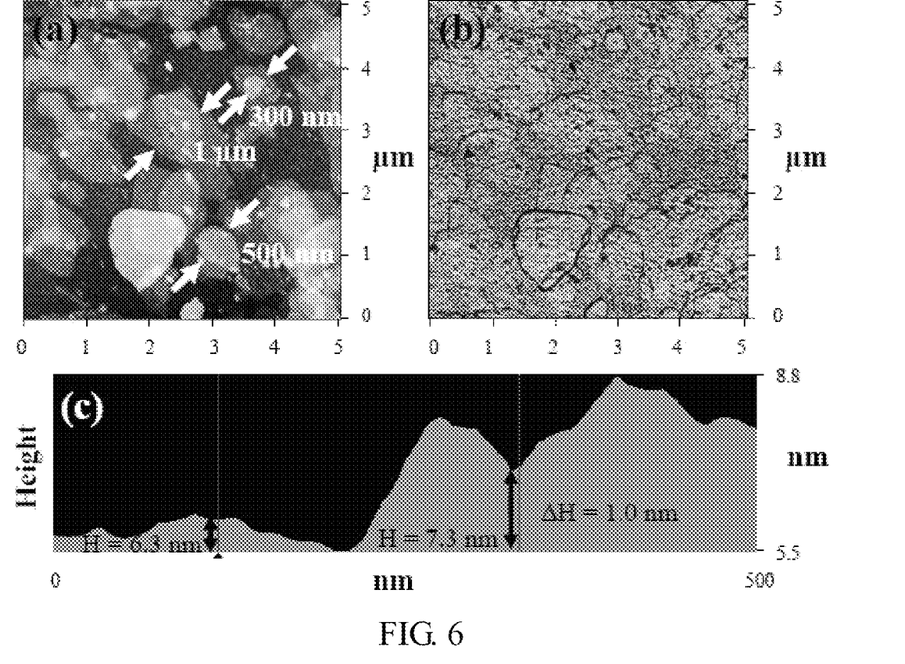
FIG. 6 shows the AFM analysis of the solution containing a nano mica platelet.

FIG. 6 shows the AFM analysis for the solution containing a nano mica platelet. The 2-dimensional structure indicates a diameter about 300~1000 nm as observed in TEM analysis, and a thickness 1 nm. That is, the nano mica platelet has a high aspect ratio. The exfoliated mica also exhibits a strong ionic property as charges between layers are exposed to adsorb Na$^+$ ions.

Analysis for the Nanosilicate Platelets

1. XRD

Figure 7:
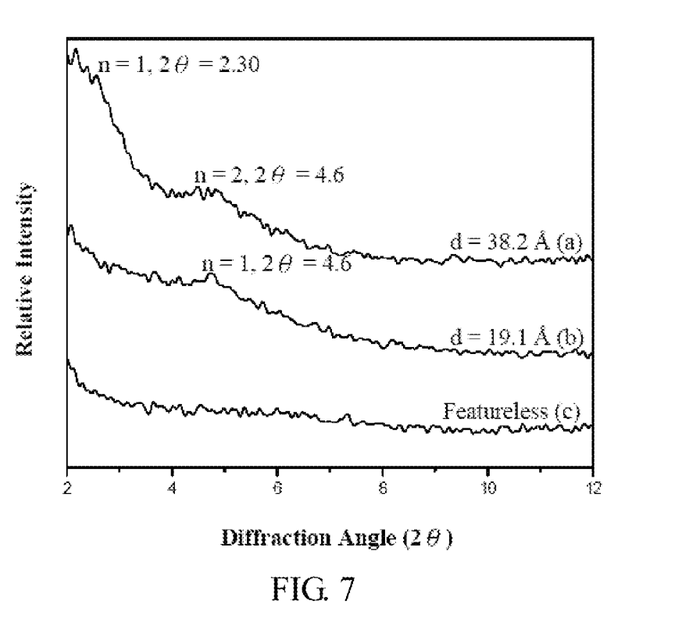
FIG. 7 shows the XRD spectrum of the MMT nanosilicate platelets.

FIG. 7 shows the XRD spectrum of the exfoliated and intercalated MMT of Example 3 and Comparative Examples 7 and 8. The interlayer distance of MMT of Example 3 shows featureless and complete exfoliation. Table 5 lists the results of products of Example 3 and Comparative Examples 6~8 with different ratios of T403 AEO/HCl/MMT.

TABLE 5

| Example/<br>Comparative<br>Example | T403 AEO/<br>HCl/MMT<br>(molar ratio) | amine/H$^+$/MMT<br>(equivalent ratio) | Interlayer<br>distance<br>(Å) | Weight ratio<br>of the exfo-<br>liating agent/<br>clay (w/w) |
|---|---|---|---|---|
| Example 3 | 3/6/1 | 18/6/1 | Exfoliated$^a$ | — |
| Comparative Example 6 | — | — | 12.6 | — |
| Comparative Example 7 | 2/4/1 | 12/4/1 | 19.1$^b$ | — |
| Comparative Example 8 | 1/2/1 | 6/2/1 | 38.2 | — |

$^a$featureless or random form of the XRD pattern, indicating a randomization of the clay layered structure.
$^b$weak peaks indicate partial exfoliation.

Table 6 lists intercalating and exfoliating effects of Example 3 and Comparative Example 10 respectively using T403 AEO and D400 AEO to react with MMT. For the same equivalent of amine/H$^+$/MMT, T403 AEO can achieve a complete exfoliation, but D400 AEO can only increase the interlayer distance of the mica to 22 Å.

TABLE 6

| Example/<br>Comparative<br>Example | Exfoliating<br>agent/<br>Intercalant | amine/H$^+$/MMT<br>(equivalent ratio) | Interlayer<br>distance<br>(Å) | Weight ratio<br>of the exfo-<br>liating agent/<br>clay (w/w) |
|---|---|---|---|---|
| Example 3 | T403 AEO | 18/6/1 | Exfoliated$^a$ | — |
| Comparative Example 10 | D400 AEO | 18/6/1 | 22$^b$ | 62/38 |

$^a$featureless or random form of the XRD pattern, indicating a randomization of the clay layered structure.
$^b$weak peaks indicate partial exfoliation.

Antiseptic Effect of the Nanosilicate Platelets

To show the antiseptic effect of the nanosilicate platelets produced in the present invention, MMT (1.0 wt %), nanosilicate platelets (1.0 wt %), mica (1.0 wt %) and nano mica platelets (1.0 wt %) are respectively added into several incubators containing *E. coli* Nova Blue. The incubated results are compared with the media containing no clay or the nanosilicate platelet. As listed in Table 7, colonies well grow (+++) in the incubator containing neither clay nor the nano platelet, in the incubator containing MMT or in the incubator containing mica; colonies are unobvious (+) in the incubator containing nanosilicate platelets; and no colony is observed in the incubator containing nano mica platelets.

TABLE 7

| Additive | None | MMT | Nanosilicate platelets (NSP) | Mica | Nano mica platelets (NMP) |
|---|---|---|---|---|---|
| Growth | +++ | +++ | + | +++ | − |

As shown in the above Examples and analysis, by properly controlling ratio of the acidified amino ends in the exfoliating agent, poly(oxypropylene)-triamine/DGEBA, MMT and synthetic fluorinated mica can be directly exfoliated. After the displacement reaction and extraction, the solution uniformly dispersing nanosilicate platelets can be obtained. In addition, the nanosilicate platelets show good antiseptic effect in the *E. coli* tests by properly controlling contents thereof, and particularly the nano mica platelets.

What is claimed is:

1. A method for producing random form of nanosilicate platelets by exfoliating inorganic clay with a hyperbranched polyamine, comprising steps of:
    (a) mixing and acidifying an exfoliating agent with an inorganic acid to form an acidified exfoliating agent, wherein the exfoliating agent is hyperbranched polyamine amine-terminated BPA epoxy oligomers (AEO) having more than two amine functional groups at two ends thereof and is obtained by reacting poly(oxypropylene)-triamine having molecular weight ranging from 100 to 1,000 with DGEBA, wherein the amine functional groups are secondary or primary;
    (b) intercalating layered inorganic silicate clay with the acidified exfoliating agent to form a first mixture; and
    (c) dissolving the first mixture in a first solvent, and reacting with at least one equivalent of a hydroxide or chloride of alkali metal or alkaline-earth metal through a displacement reaction to form a second mixture containing the random form of nanosilicate platelets.

2. The method of claim 1, wherein the inorganic acid of the step (a) is hydrochloric acid, nitric acid, phosphoric acid or sulfuric acid.

3. The method of claim 1, wherein the exfoliating agent and the inorganic acid of the step (a) have an equivalent ratio $NH_2:H^+=0.5:1-3:1$.

4. The method of claim 1, wherein the exfoliating agent is mixed and acidified with the inorganic acid of the step (a) at 30-70° C.

5. The method of claim 1, wherein the layered inorganic silicate clay of the step (b) is montmorillonite, mica, kaolin, vermiculite, K10 montmorillonite, synthetic clay SWN or layered double hydroxides (LDH).

6. The method of claim 1, wherein the layered inorganic silicate clay of the step (b) is swelled synthetic fluoride mica or montmorillonite.

7. The method of claim 1, wherein the layered inorganic silicate clay of the step (b) has a cationic exchange capacity (CEC) ranging from 0.5 to 2.0 mequiv/g.

8. The method of claim 1, wherein the acidified exfoliating agent and the layered inorganic silicate clay of the step (b) have an equivalent ratio $NH_2:CEC>1$.

9. The method of claim 1, wherein the hyperbranched polyamine in the acidified exfoliating agent and CEC of the layered inorganic silicate clay of the step (b) have an equivalent ratio ranging from 0.3:1 to 5:1.

10. The method of claim 1, wherein the intercalation reaction of the step (b) is performed at 70-90° C. for 3-5 hours.

11. The method of claim 1, wherein the first solvent of the step (c) is methanol.

12. The method of claim 1, wherein the first mixture and the first solvent of the step (c) are mixed in a volume ratio ranging from 0.03:1 to 30:1.

13. The method of claim 1, wherein the hydroxide or chloride of alkali metal or alkaline-earth metal of the step (c) is NaOH or KOH.

14. The method of claim 1, wherein the first mixture and the hydroxide or chloride of alkali metal or alkaline-earth metal of the step (c) have an equivalent ratio ranging from 0.3:1 to 3:1.

15. The method of claim 1, wherein the displacement reaction of the step (c) is performed at 50-70° C. for 1-3 hours.

16. The method of claim 1, wherein the step (c) is repeated.

17. The method of claim 1, further comprising a step after the step (c):
    (d) mixing the second mixture with water and a second solvent to perform extraction and an extract containing the random form of nanosilicate platelets is obtained.

18. The method of claim 17, wherein the second solvent of the step (d) is toluene.

19. The method of claim 17, wherein the first solvent is methanol and the second solvent is toluene in the step (d), and volume ratio of methanol:toluene:water ranges from 0.3:0.3:1 to 3:3:1.

20. The method of claim 17, wherein the extraction of the step (d) is performed at 30-70° C. for 1-3 hours.

21. The method of claim 17, further comprising a step after the step (d): (e) removing the first solvent, the second solvent, or both from the extract containing the nanosilicate platelets.

* * * * *